(12) United States Patent
Li et al.

(10) Patent No.: US 6,987,896 B1
(45) Date of Patent: Jan. 17, 2006

(54) OPTICAL ISOLATOR

(75) Inventors: Wei-Zhong Li, San Jose, CA (US); Qingdong Guo, Sunnyvale, CA (US)

(73) Assignee: Oplink Communications, Inc., Fremont, CA (US)

( * ) Notice: Subject to any disclaimer, the term of this patent is extended or adjusted under 35 U.S.C. 154(b) by 8 days.

(21) Appl. No.: 10/119,627

(22) Filed: Apr. 9, 2002

(51) Int. Cl.
*G02B 6/00* (2006.01)

(52) U.S. Cl. .............. 385/11; 385/31; 385/47; 359/483; 359/495

(58) Field of Classification Search .......... 385/11, 385/15, 31, 39, 47, 33; 359/483, 494, 495
See application file for complete search history.

(56) References Cited

U.S. PATENT DOCUMENTS

| | | | |
|---|---|---|---|
| 4,548,478 A | 10/1985 | Shirasaki | |
| 5,402,509 A * | 3/1995 | Fukushima | 385/33 |
| 5,408,354 A | 4/1995 | Hosokawa | |
| 5,493,440 A | 2/1996 | Souda et al. | |
| 5,499,132 A | 3/1996 | Tojo et al. | |
| 5,574,595 A | 11/1996 | Kurata et al. | |
| 5,606,439 A | 2/1997 | Wu | |
| 5,930,039 A | 7/1999 | Li et al. | |
| 6,052,228 A | 4/2000 | Xie et al. | |
| 6,061,167 A * | 5/2000 | Song | 359/256 |
| 6,212,313 B1 * | 4/2001 | Li | 385/24 |
| 6,282,025 B1 | 8/2001 | Huang et al. | |
| 6,310,989 B1 * | 10/2001 | Liu | 385/11 |
| 6,331,913 B1 | 12/2001 | Huang et al. | |
| 6,339,661 B1 | 1/2002 | Kokkelink et al. | |
| 6,466,704 B1 * | 10/2002 | Frisken | 385/11 |
| 6,480,331 B1 | 11/2002 | Cao | |
| 6,507,422 B1 | 1/2003 | Fukushima | |
| 6,628,455 B1 | 9/2003 | Lee | |
| 6,628,461 B2 * | 9/2003 | Huang et al. | 359/494 |
| 6,819,810 B1 * | 11/2004 | Li et al. | 385/11 |
| 6,839,170 B2 * | 1/2005 | Li | 359/84 |
| 2001/0053022 A1 | 12/2001 | Tai et al. | |
| 2002/0008901 A1 | 1/2002 | Kinoshita | |
| 2002/0060843 A1 | 5/2002 | Huang et al. | |
| 2002/0191289 A1 | 12/2002 | Chuang | |
| 2003/0063832 A1 * | 4/2003 | Hellman et al. | 385/11 |
| 2003/0072512 A1 * | 4/2003 | Nagaeda et al. | 385/11 |
| 2004/0070827 A1 * | 4/2004 | Li | 359/484 |
| 2004/0218845 A1 * | 11/2004 | Li et al. | 385/11 |

FOREIGN PATENT DOCUMENTS

| | | |
|---|---|---|
| CN | 2226355 Y | 5/1996 |
| EP | 653660 A1 * | 5/1995 |

\* cited by examiner

*Primary Examiner*—Rodney Bovernick
*Assistant Examiner*—Sung Pak
(74) *Attorney, Agent, or Firm*—Fish & Richardson P.C.

(57) ABSTRACT

An optical isolator includes a non-reciprocal combination-device and a reflector. The non-reciprocal combination-device has a principal direction and includes a first birefringent wedge, a second birefringent wedge, and a non-reciprocal rotating element. The non-reciprocal rotating element can be a Faraday rotator. The reflector is positioned proximate to the second birefringent wedge, for reflecting light exiting from the non-reciprocal combination-device in the principal direction to reenter the non-reciprocal combination-device in a reverse principal direction. The optical isolator can include a lens that is optically coupled to the first wedge. The optical isolator can include a capillary for holding an input PM optical fiber and an output PM optical fiber. The optical isolator can also include a capillary for holding at least two input PM optical fibers and an output optical fiber.

22 Claims, 10 Drawing Sheets

OPTICAL ISOLATOR

BACKGROUND OF THE INVENTION

Optical depolarizers, optical combiners, and optical isolators are commonly used in optical communication systems and optical measurement systems. An optical depolarizer is generally designed to change a beam of completely polarized light or a beam of partially polarized light into a beam of depolarized light. An optical combiner is a device generally designed to combine two beams of light into one beam of light. An optical isolator is a device generally designed to allow a beam of light to pass through the device in a chosen direction and to prevent the beam of light from passing through the device in the opposite of that chosen direction.

SUMMARY OF THE INVENTION

In one aspect, the invention provides an optical isolator. The optical isolator includes a non-reciprocal combination-device and a reflector. The non-reciprocal combination-device has a principal direction and includes a first birefringent wedge, a second birefringent wedge, and a non-reciprocal rotating element. The first birefringent wedge has a first optical axis perpendicular to the principal direction. The second birefringent wedge has a second optical axis perpendicular to the principal direction, and the second optical axis forms a first angle with respect to the first optical axis. The non-reciprocal rotating element is optically coupled between the first and the second birefringent wedge. The non-reciprocal rotating element is designed to rotate the polarization of light passing through the non-reciprocal rotating element by a second angle. The non-reciprocal rotating element can be a Faraday rotator. The reflector is positioned proximate to the second birefringent wedge, for reflecting light exiting from the non-reciprocal combination-device in the principal direction to reenter the non-reciprocal combination-device in a reverse principal direction. The optical isolator can include a lens that is optically coupled to the first wedge. The optical isolator can include a capillary for holding an input PM optical fiber and an output PM optical fiber. Alternatively, the optical isolator can include a capillary for holding at least two input PM optical fibers and an output optical fiber.

In another aspect, the invention provides an optical isolator. The optical isolator includes a non-reciprocal combination-device and a reflector. The non-reciprocal combination-device has a principal direction and includes a first birefringent wedge, a second birefringent wedge, and a non-reciprocal rotating element. The non-reciprocal rotating element can be a Faraday rotator. The reflector is positioned proximate to the second birefringent wedge, for reflecting light exiting from the non-reciprocal combination-device in the principal direction to reenter the non-reciprocal combination-device in a reverse principal direction. The non-reciprocal combination-device is configured for enabling at least the following functions: (1) light entering the second birefringent wedge as an e-ray in a first input direction exits from the second birefringent wedge as an o-ray in the principal direction; (2) light entering the first birefringent wedge as an o-ray in a second input direction exits from the second birefringent wedge as an e-ray in the principal direction; (3) light entering the second birefringent wedge as an e-ray in a reverse principal direction exits from the first birefringent wedge as an e-ray in the reverse principal direction; and (4) light entering the second birefringent wedge as an o-ray in the reverse principal direction exits from the first birefringent wedge as an o-ray in the reverse principal direction.

In another aspect, the invention provides a method of combing first and second polarized light to form combined light in an output port. The method includes the step of providing a non-reciprocal combination-device having a principal direction and a reverse principal direction. The method includes the step of directing the first polarized light to enter the non-reciprocal combination-device in a first input direction and to exit from the non-reciprocal combination-device in the principal direction as first intermediate light. The method includes the step of directing the second polarized light to enter the non-reciprocal combination-device in a second input direction and to exit from the non-reciprocal combination-device in the principal direction as second intermediate light. The method includes the step of reflecting the first and the second intermediate light to pass back through the non-reciprocal combination-device in the reverse principal direction and to enter the output port as the combined light.

In another aspect, the invention provides a method of directing polarized light from an input port to enter an output port and preventing polarized light from the output port to enter the input port. The method includes the step of providing a non-reciprocal combination-device having a principal direction and a reverse principal direction. The method includes the step of directing the polarized light to enter the non-reciprocal combination-device in an input direction and to exit from the non-reciprocal combination-device in the principal direction as intermediate light. The method includes the step of reflecting the intermediate light to pass back through the non-reciprocal combination-device in the reverse principal direction and enter the output port.

Aspects of the invention can include one or more of the following advantages. Implementations of the invention provide an optical isolator that may have small insertion loss, compact size, and reduced manufacturing cost. Other advantages will be readily apparent from the attached figures and the description below.

BRIEF DESCRIPTION OF THE DRAWINGS

FIG. 1b illustrates a specific configuration of birefringent wedges and a Faraday rotator of FIG. 1a.

FIGS. 1c–1e illustrate alternative configurations of the birefringent wedges and the Faraday rotator of FIG. 1a.

DETAILED DESCRIPTION OF THE INVENTION

The present invention relates to an improvement in optical technology. The following description is presented to enable one of ordinary skill in the art to make and use the invention and is provided in the context of a patent application and its requirements. Various modifications to the invention will be readily apparent to those skilled in the art and the generic principals herein may be applied to other embodiments. Thus, the present invention is not intended to be limited to the embodiments shown, but is to be accorded the widest scope consistent with the principals and features described herein.

The present invention will be described in terms of a non-reciprocal combination-device, an optical depolarizer, an optical depolarizing combiner, an optical combiner, and a Polarization Maintenance ("PM") isolator each having specific components having specific configurations. Similarly, the present invention will be described in terms of components having specific relationships, such as distances or angles between components. However, one of ordinary skill in the art will readily recognize that the devices and systems described can include other components having similar properties, other configurations, and other relationships between components.

In the instant application, implementations of optical depolarizers, optical depolarizing combiners, optical combiners, and PM isolators using non-reciprocal combination-devices are described. The configuration and operation of the non-reciprocal combination device is described in greater detail below. The non-reciprocal combination-device generally includes two birefringent wedges and a non-reciprocal rotating element such as a Faraday rotator.

Figure 1A:
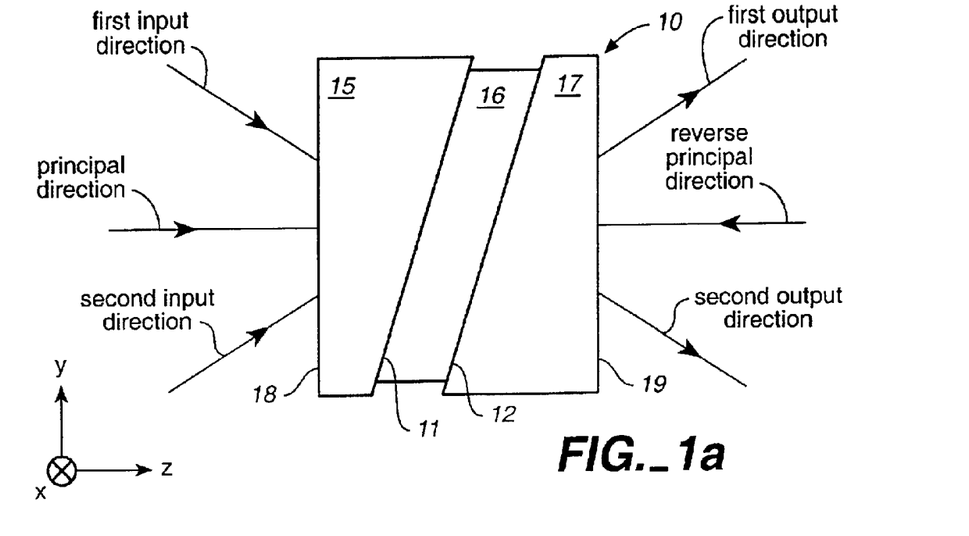
FIG. 1a illustrates an implementation of a non-reciprocal combination-device.
Figure 1B:
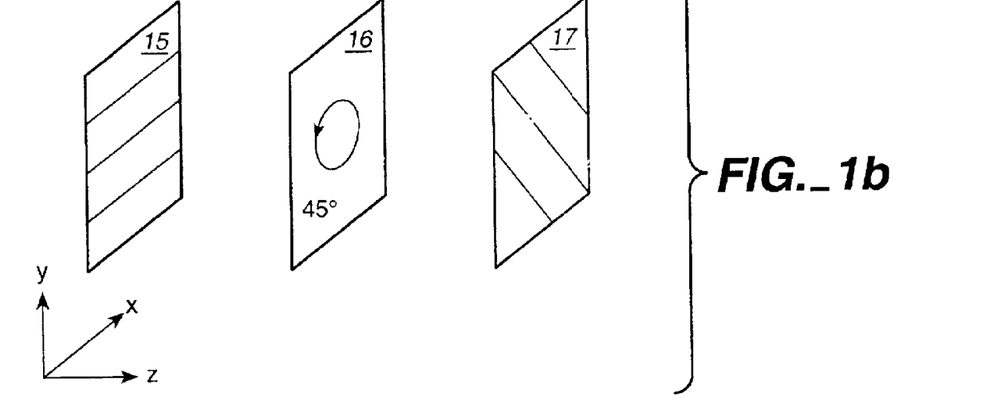

FIGS. 1a and 1b illustrate an implementation of a non-reciprocal combination-device 10 that includes a birefringent wedge 15, a birefringent wedge 17, and a non-reciprocal rotating element such as Faraday rotator 16. Birefringent wedges 15 and 17 are in the form of tapered plates. Surface 11 of birefringent wedge 15 faces surface 12 of birefringent wedge 17. In one implementation of non-reciprocal combination-device 10, surface 11 of birefringent wedge 15 substantially parallels surface 12 of birefringent wedge 17.

A coordinate system is illustrated including the x-direction, the y-direction and the z-direction. The optical axis of birefringent wedge 15 is in the x-direction. The optical axis of birefringent wedge 17 is in the x–y direction. Faraday rotator 16 is designed in such a way that, when light passes through the Faraday rotator 16 either in the positive or the negative z-direction, the polarization of the light will be rotated 45 degrees with respect to the positive z-axis. F, Non-reciprocal combination-device 10 has a principal direction that is in the positive z-direction. Non-reciprocal combination-device 10 also has a first input direction that is in the z–Δy direction, a second input direction that is in the z+βy direction, a first output direction that is in the z+γy direction, and a second output direction that is in the z–δy direction. Where Δ, β, γ and δ are positive numbers.

In general, non-reciprocal combination-device 10, including a first and a second birefringent wedge, is constructed to perform one or more of the following six functions:

(1) light entering the first birefringent wedge as an e-ray in the principal direction exits from the second birefringent wedge as an o-ray in the first output direction;

(2) light entering the first birefringent wedge as an o-ray in the principal direction exits from the second birefringent wedge as an e-ray in the second output direction;

(3) light entering the first birefringent wedge as an e-ray in the first input direction exits from the second birefringent wedge as an o-ray in the principal direction;

(4) light entering the first birefringent wedge as an o-ray in the second input direction exits from the second birefringent wedge as an e-ray in the principal direction;

(5) light entering the second birefringent wedge as an e-ray in the reverse principal direction exits from the first birefringent wedge as an e-ray in the reverse principal direction; and (6) light entering the second birefringent wedge as an o-ray in the reverse principal direction exits from the first birefringent wedge as an o-ray in the reverse principal direction.

Figure 2A:
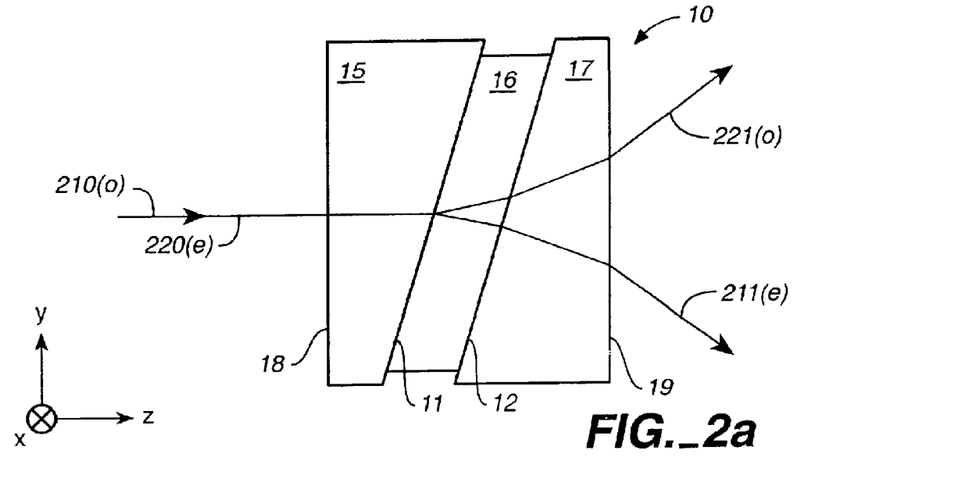
FIG. 2a illustrates the paths traveled by light that enters the non-reciprocal combination-device of FIG. 1 a in the principal direction.
Figure 2B:
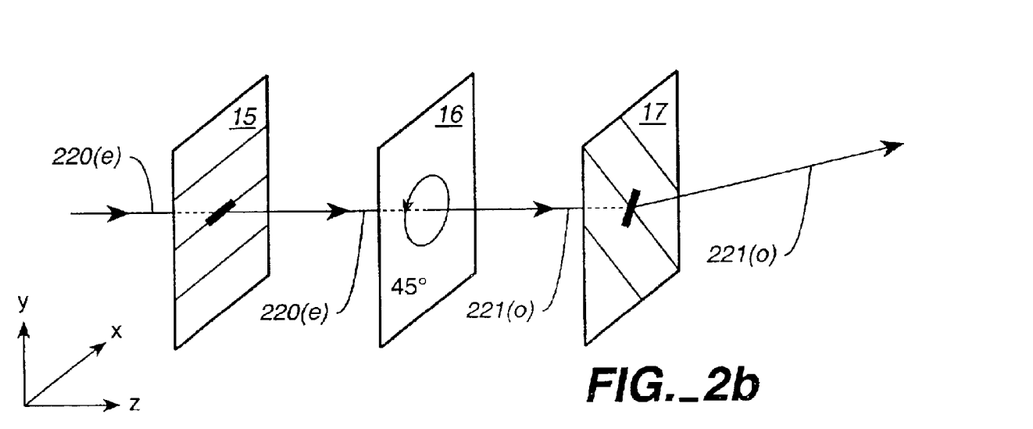
FIG. 2b illustrates that light entering the first birefringent wedge as an e-ray in the principal direction exits from the second birefringent wedge as an o-ray in the first output direction.
Figure 2C:
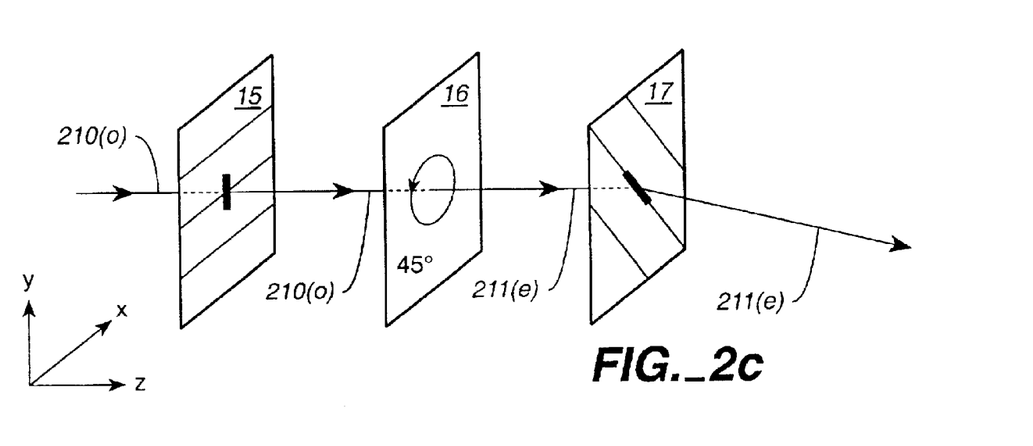
FIG. 2c illustrates that light entering the first birefringent wedge as an o-ray in the principal direction exits from the second birefringent wedge as an e-ray in the second output direction.
Figure 3A:
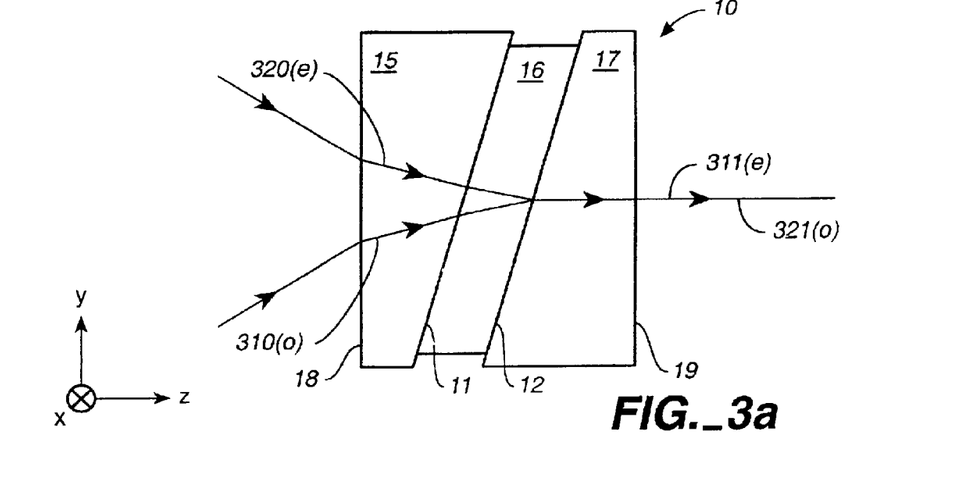
FIG. 3a illustrates the paths traveled by light that enters the non-reciprocal combination-device of FIG. 1a in the first and the second input direction.
Figure 3B:
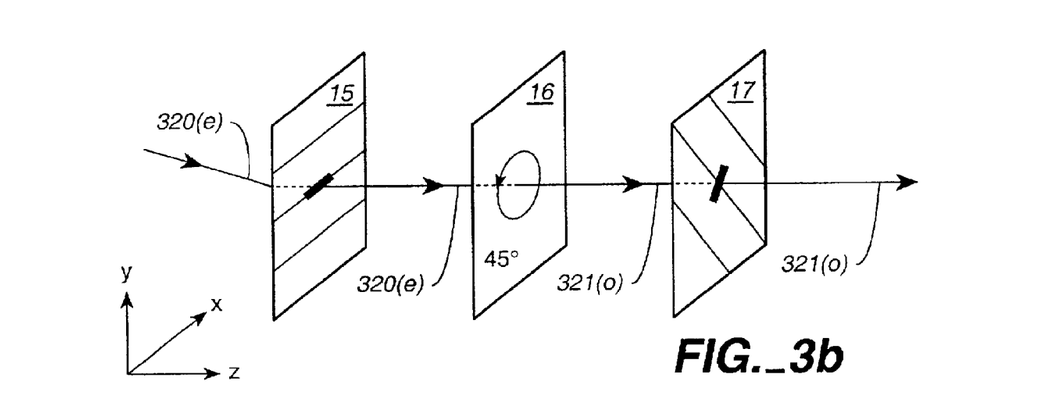
FIG. 3b illustrates that light entering the second birefringent wedge as an e-ray in the first input direction exits from the second birefringent wedge as an o-ray in the principal direction.
Figure 3C:
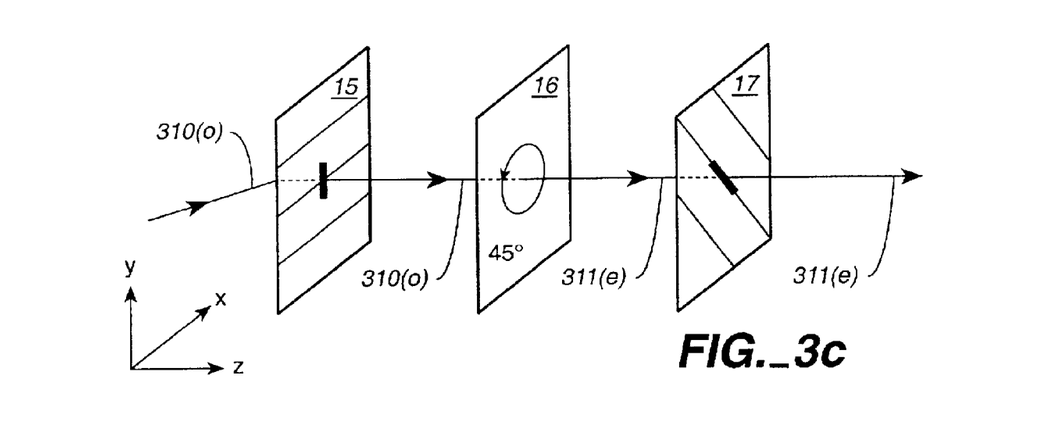
FIG. 3c illustrates that light entering the first birefringent wedge as an o-ray in the second input direction exits from the second birefringent wedge as an e-ray in the principal direction.
Figure 4A:
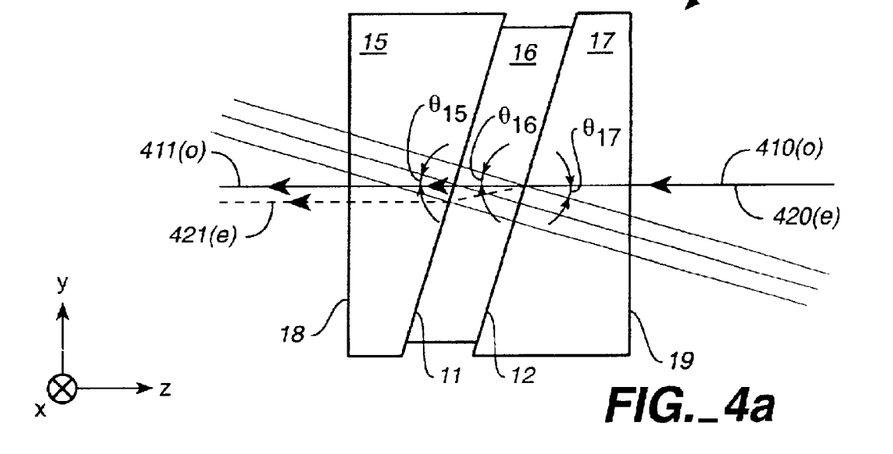
FIG. 4a illustrates the paths traveled by the light that enters the non-reciprocal combination-device of FIG. 1a in the reverse principal direction.
Figure 4B:
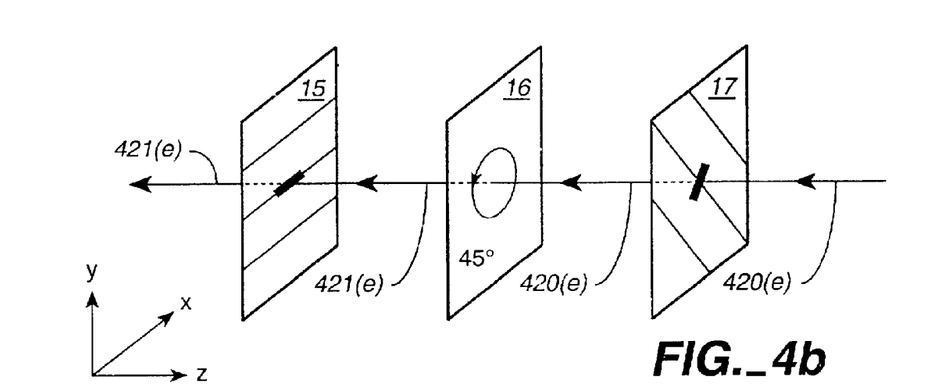
FIG. 4b illustrates that light entering the second birefringent wedge as an e-ray in the reverse principal direction exits from the first birefringent wedge as an e-ray in the reverse principal direction.
Figure 4C:
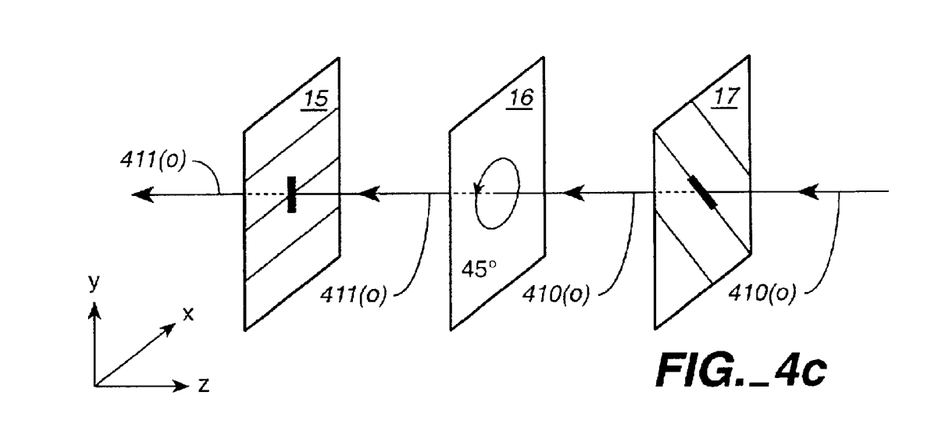
FIG. 4c illustrates that light entering the second birefringent wedge as an o-ray in the reverse principal direction exits from the first birefringent wedge as an o-ray in the reverse principal direction.

FIGS. 2a and 2b illustrate the first function in detail. FIGS. 2a and 2c illustrate the second function in detail. FIGS. 3a and 3b illustrate the third function in detail. FIGS. 3a and 3c illustrate the fourth function in detail. FIGS. 4a and 4b illustrate the fifth function in detail. FIGS. 4a and 4c illustrate the sixth function in detail.

As shown in FIGS. 2a and 2b, light 220(e) traveling in the principal direction (i.e., the positive z-direction) enters birefringent wedge 15 as an e-ray with the x polarization. Light 220(e) is refracted at surface 11. After passing through Faraday rotator 16, the polarization of light 220(e) is rotated positive 45 degrees with respect to the positive z-axis, and light 220(e) becomes light 221(o) with the x+y polarization. Light 221(o) is refracted again at surface 12 and enters birefringent wedge 17 as an o-ray. Light 221(o) exits from birefringent wedge 17 traveling generally in the first output direction (i.e., the z+γy direction).

As shown in FIGS. 2a and 2c, light 210(o) traveling in the principal direction (i.e., the positive z-direction) enters birefringent wedge 15 as an o-ray with the y polarization. Light 210(o) is refracted at surface 11. After passing through Faraday rotator 16, the polarization of light 210(o) is rotated positive 45 degrees with respect to the positive z-axis, and light 210(o) becomes light 211(e) with the x-y polarization. Light 211(e) is refracted again at surface 12 and enters birefringent wedge 17 as an e-ray. Light 211(e) exits from birefringent wedge 17 traveling generally in the second output direction (i.e., the z−δy direction).

As shown in FIGS. 3a and 3b, light 320(e) traveling in the first input direction (i.e., the z−αy direction) enters birefringent wedge 15 as an e-ray with the x polarization. Light 320(e) is refracted at surface 11. After passing through Faraday rotator 16, the polarization of light 320(e) is rotated 45 positive degrees with respect to the positive z-axis, and light 320(e) becomes light 321(o) with the x+y polarization. Light 321(o) is refracted again at surface 12 and enters birefringent wedge 17 as an o-ray. Light 321(o) exits from birefringent wedge 17 traveling in the principal direction (i.e., the positive z-direction).

As shown in FIGS. 3a and 3c, light 310(o) traveling in the second input direction (i.e., the z+βy direction) enters birefringent wedge 15 as an o-ray with the y polarization. Light 310(o) is refracted at surface 11. After passing through Faraday rotator 16, the polarization of light 310(o) is rotated positive 45 degrees with respect to the positive z-axis, and light 310(o) becomes light 311(e) with the x-y polarization. Light 311(e) is refracted again at surface 12 and enters birefringent wedge 17 as an e-ray. Light 311(e) exits from birefringent wedge 17 traveling in the principal direction (i.e., the positive z-direction).

As shown in FIGS. 4a and 4b, light 420(e) traveling in the reverse principal direction (i.e., the negative z-direction) enters birefringent wedge 17 as an e-ray with the x-y polarization. Light 420(e) is refracted at surface 12. After passing through Faraday rotator 16, the polarization of light 420(e) is rotated positive 45 degrees with respect to the positive z-axis, and light 420(e) becomes light 421(e) with the x polarization. Light 421(e) is refracted again at surface 11 and enters birefringent wedge 15 as an e-ray. Light 421(e) exits from birefringent wedge 15 traveling in the reverse principal direction (i.e., the negative z-direction).

As shown in FIGS. 4a and 4c, light 410(o) traveling in the reverse principal direction (i.e., the negative z-direction) enters birefringent wedge 17 as an o-ray with the x+y polarization. Light 410(o) is refracted at surface 12. After passing through Faraday rotator 16, the polarization of light 410(o) is rotated positive 45 degrees with respect to the positive z-axis, and light 410(o) becomes light 411(o) with the y polarization. Light 410(o) is refracted again at surface 11 and enters birefringent wedge 15 as an o-ray. Light 411(o) exits from birefringent wedge 15 traveling in the reverse principal direction (i.e., the negative z-direction).

Due to the differences in the refractive index between the o-ray and the e-ray, light 421(e) and 411(o) can exit from birefringent wedge 15 with different paths. However, when the paths of 421(e) and 411(o) are substantially parallel, light 421(e) and 411(o) can be coupled to an optical fiber using a collimator.

In the implementation of non-reciprocal combination-device 10 shown in FIG. 1b, the optical axes of birefringent wedges 15 and 17 are, respectively, in the x direction and the x-y direction. Faraday rotator 16 is designed in such a way that the polarization of light passing through the Faraday rotator 16 will be rotated a positive 45 degrees with respect to the positive z-axis.

Figure 1C:
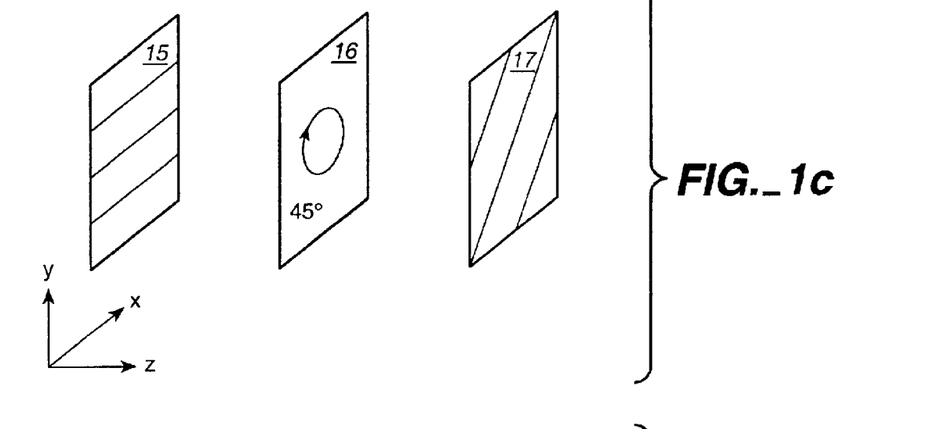

In another implementation of non-reciprocal combination-device 10, as shown FIG. 1c, the optical axes of birefringent wedges 15 and 17 are, respectively, in the x direction and the x+y direction. Faraday rotator 16 is designed in such a way that the polarization of light passing through the Faraday rotator 16 will be rotated a negative 45 degrees with respect to the positive z-axis.

Figure 1D:
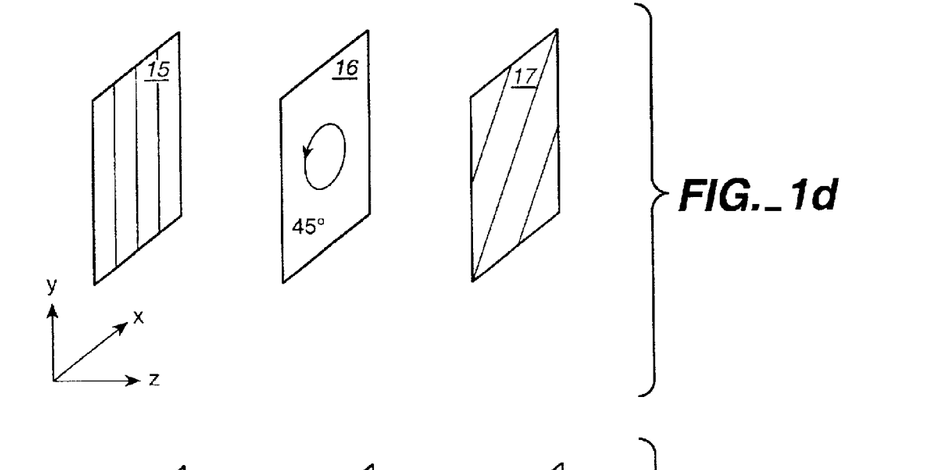

In a third implementation of non-reciprocal combination-device 10, as shown in FIG. 1d, the optical axes of birefringent wedges 15 and 17 are, respectively, in the y direction and the x+y direction. Faraday rotator 16 is designed in such a way that the polarization of light passing through the Faraday rotator 16 will be rotated a positive 45 degrees with respect to the positive z-axis.

Figure 1E:
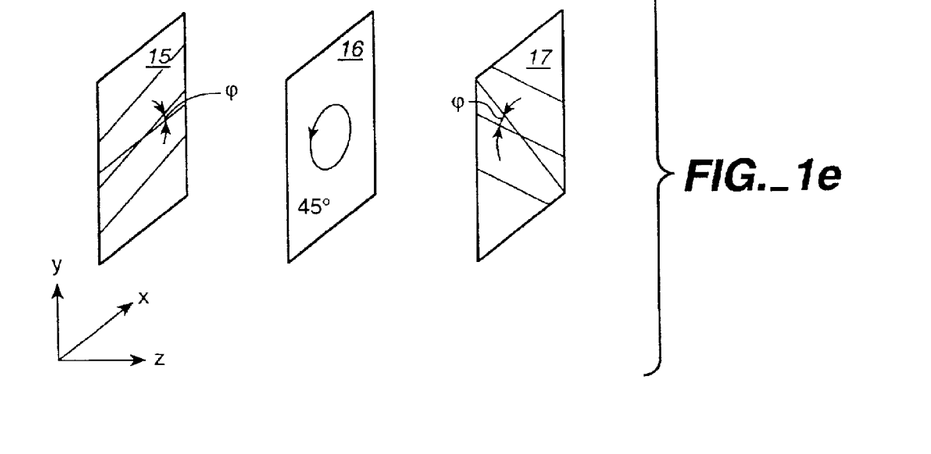

In a fourth implementation of non-reciprocal combination-device 10, as shown in FIG. 1e, the optical axes of birefringent wedges 15 and 17 are, respectively, in the $\cos(\phi)x+\sin(\phi)$ y direction and the $\cos(\phi-45)x+\sin(\phi-45)$ y direction. Faraday rotator 16 is designed in such a way that the polarization of light passing through the Faraday rotator 16 will be rotated positive 45 degrees with respect to the positive z-axis.

In the implementation of non-reciprocal combination-device 10, as shown in FIG. 1a, birefringent wedges 15 and 17 are essentially in contact with Faraday rotator 16. In other implementations, other optical media (including air) can be inserted between birefringent wedge 15 and Faraday rotator 16, and between birefringent wedge 17 and Faraday rotator 16.

Figure 5A:
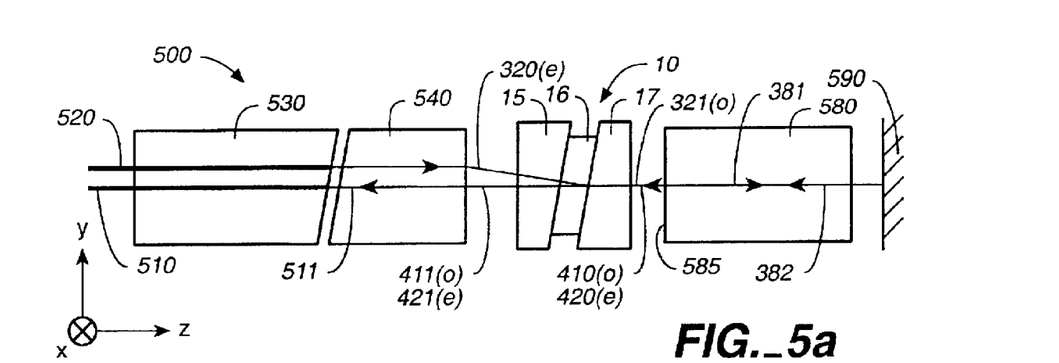
FIGS. 5a–5d illustrate an implementation of an optical depolarizer 500.

FIG. 5a illustrates an implementation of an optical depolarizer 500 that includes a non-reciprocal combination-device 10. Depolarizer 500 also includes a lens 540, a birefringent block 580, and a reflector 590. A single mode fiber 510 and a Polarization Maintenance ("PM") fiber 520 are coupled to lens 540. The positions of single mode fiber 510 and PM fiber 520 can be fixed with a capillary 530. The optical axis of birefringent block 580 can be in the y-direction. Birefringent block 580 includes surface 585 of facing wedge 17.

Figure 5B:
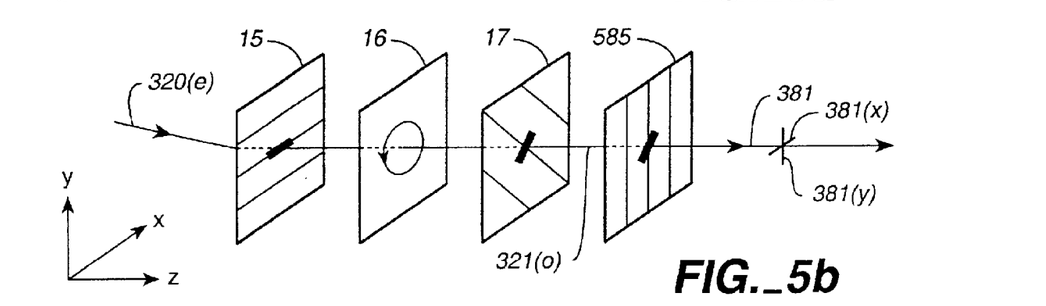

As shown in FIGS. 5a and 5b, light with the x-polarization exiting from PM fiber 520 is coupled to non-reciprocal combination-device 10 through lens 540, and enters non-reciprocal combination-device 10 in the first input direction (i.e., the z−Δy direction) as e-ray 320(e). After passing through non-reciprocal combination-device 10, e-ray 320(e) becomes o-ray 321(o) traveling in the principal direction (i.e., the positive z-direction) with the x+y polarization. o-ray 321(o) enters surface 585 of birefringent block 580 as light 381.

Light 381 can be decomposed as light 381(x) with the x-polarization and 381(y) with the y-polarization. Because the optical axis of birefringent block 580 is in the y-direction, light 381(x) and 381(y) are, respectively, the o-ray and the e-ray in birefringent block 580. Light 381(x) travels in the positive z-direction with the phase velocity of an o-ray. Light 381(y) travels in the positive z-direction with the phase velocity of an e-ray. Light 381(x) and 381(y) are reflected by reflector 590, and become, respectively, light 382(x) and 382(y). Light 381(x) travels in the negative z-direction with the phase velocity of an o-ray. Light 381(y) travels in the negative z-direction with the phase velocity of an e-ray. Light 382(x) and 382(y) are recombined at surface 585 as light 382.

When light 381 traveling in the positive z-direction enters surface 585, the phase difference between the decomposed light $381(x)$ and $381(y)$ is zero. The polarization of light 381 is $x+\exp(j\,\theta_t)y$, with $\theta_t=0$. When light $382(x)$ and $382(y)$ are recombined at surface 585 as light 382 traveling in the negative z-direction, the phase difference between the decomposed light $382(x)$ and $382(y)$ is $\theta_f$. Phase difference $\theta_f$ is given by of $\theta_f=4\pi(n_e-n_o)L/\lambda$, where L is the length of the birefringent block 580, $\lambda$ is the wavelength of light 382 (and light 381), $n_e$ and $n_o$ are respectively the refractive indexes of the e-ray and the o-ray. The polarization of light 382 is $x+\exp(j\,\theta_f)y$.

For a selected wavelength $\lambda_1$, the phase difference $\theta_f$ can be zero, and the polarization of light 382 can be in the x+y direction. For another selected wavelength $\lambda_2$, the phase difference $\theta_f$ can be equal to it, and the polarization of light 382 can be in the x−y direction. For a third selected wavelength $\lambda_3$, the phase difference $\theta_f$ can be equal to $\pi/2$, and the polarization of light 382 can be in the x+jy direction (i.e., light 382 is circularly polarized).

When light 382 enters non-reciprocal combination-device 10 with the $x+\exp(j\,\theta_f)y$ polarization, light 382 can be decomposed as light $420(e)$ with the x−y polarization and light $410(o)$ with the x+y polarization and given by equation $$[x+\exp(j\,\theta_f)y]/2^{1/2}=[\cos(\theta_f/2)o-j\sin(\theta_f/2)\,e]\exp(j\,\theta_f/2),$$

where $o=[x+y]/2^{1/2}$ and $e=[x-y]/2^{1/2}$. The intensity of light $410(o)$ is proportional to $[\sin(\theta_f/2)]^2$. The intensity of light $410(o)$ is proportional to $[\cos(\theta_f/2)]^2$.

Figure 5C:
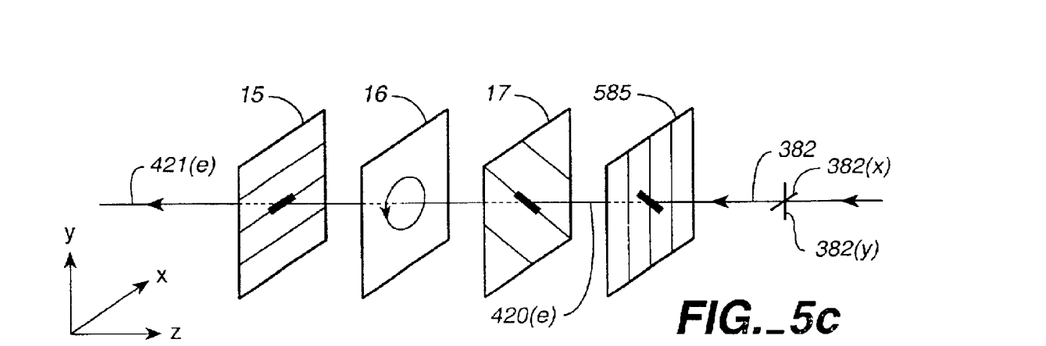

As shown in FIG. 5a and FIG. 5c, light $420(e)$ passes through non-reciprocal combination-device 10 as light 421 ($e$) with the x-polarization. Light $421(e)$ passes through lens 540, and enters single mode fiber 510 with the x-polarization.

Figure 5D:
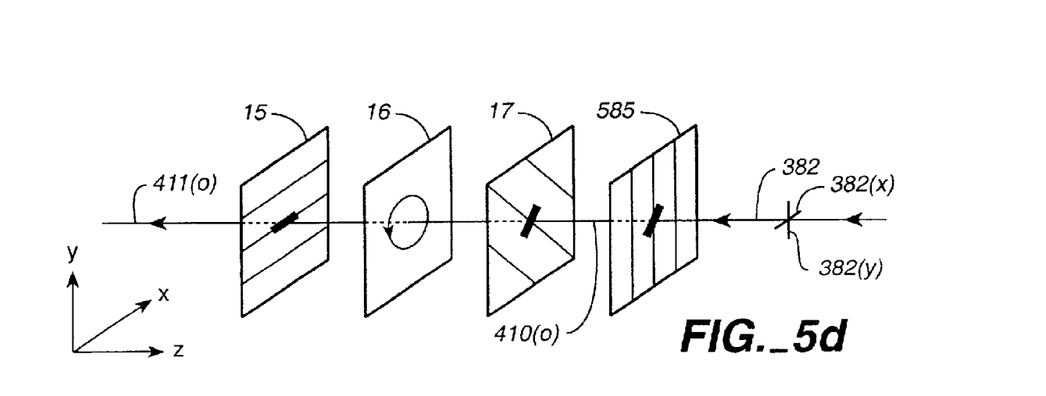

As shown in FIG. 5a and FIG. 5d, light $410(o)$ passes through non-reciprocal combination-device 10 as light 411 ($o$) with the y-polarization. Light $411(o)$ passes through lens 540, and enters single mode fiber 510 with the y-polarization.

Therefore, light $320(e)$ with the x-polarization exiting from PM fiber 520 can be directed into single mode fiber 510 as light 511 that in general has both the x-polarization component and the y-polarization component. If light $320(e)$ has wavelength $\lambda_1$ and $\theta_f=0$, then, light 511 has mostly the y-polarization component. If light $320(e)$ has wavelength $\lambda_2$, and $\theta_f=\pi$, then, light 511 has mostly the x-polarization component. If light $320(e)$ has wavelength between $\lambda_2$ and $\lambda_1$, then, light 511 in general has both the x-polarization component and the y-polarization component.

When light $320(e)$ has a certain bandwidth, with wavelengths ranging from $\lambda_2$ to $\lambda_1$, light 511 entering single mode fiber 510 can become depolarized.

Figure 6A:
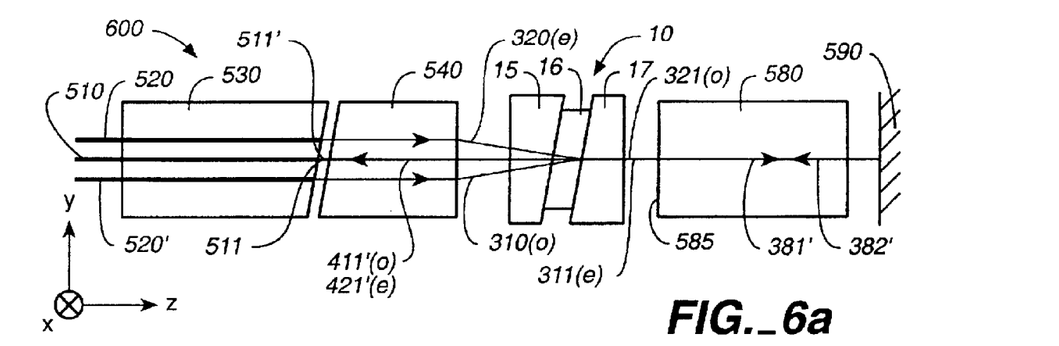
FIGS. 6a–6d illustrate an implementation of an optical depolarizing combiner 600.

FIG. 6a illustrates an implementation of an optical depolarizing combiner 600 that includes non-reciprocal combination-device 10. Depolarizing combiner 600 also includes a lens 540, a birefringent block 580, and a reflector 590. A single mode fiber 510, a first PM fiber 520, and a second PM fiber 520' are coupled to lens 540. The positions of single mode fiber 510, the first PM fiber 520, and the second PM fiber 520' can be fixed with a capillary 530. The optical axis of birefringent block 580 can be in the y-direction. Surface 585 of birefringent block 580 faces wedge 17.

FIG. 6a illustrates that light $320(e)$ with the x-polarization exiting from PM fiber 520 can be directed into single mode fiber 510 as light 511 that in general has both the x-polarization component and the y-polarization component.

Figure 6B:
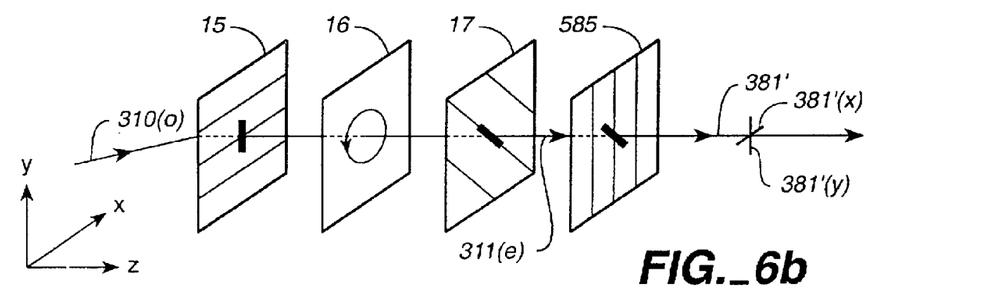
Figure 6C:
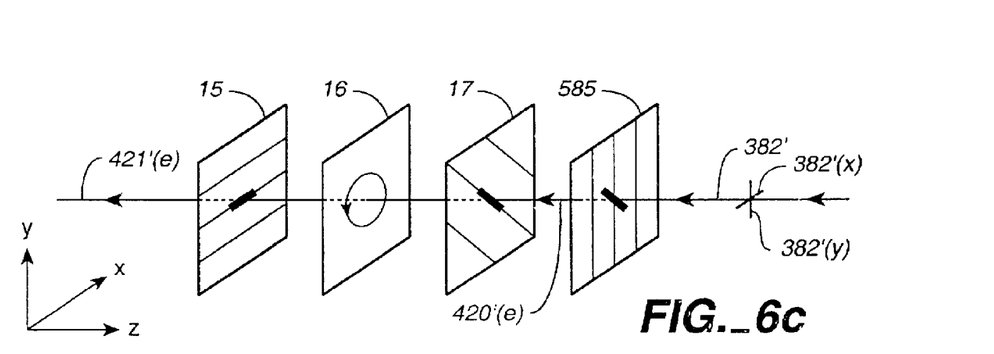
Figure 6D:
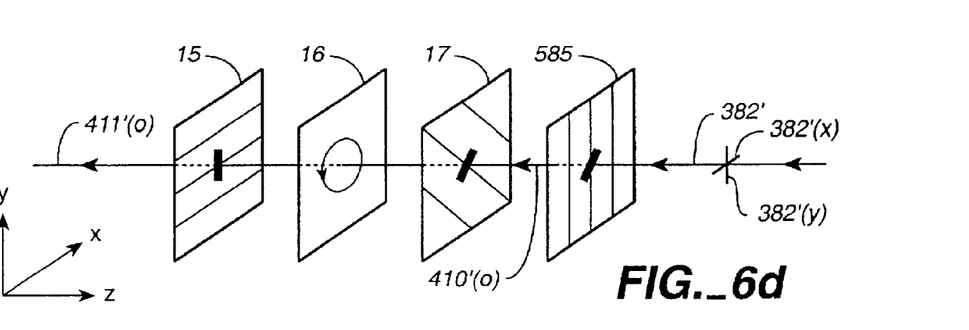

FIG. 6a also illustrates that light $310(o)$ with the y-polarization exiting from PM fiber 520' can be directed into single mode fiber 510 as light 511' that in general has both the x-polarization component and the y-polarization component. FIGS. 6b–6d show in detail the processing of light $310(o)$.

As shown FIGS. 6a and 6b, light $310(o)$ with the y-polarization exiting from PM fiber 520' is coupled to non-reciprocal combination-device 10 through lens 540. Light $310(o)$ enters non-reciprocal combination-device 10 in the second input direction (i.e., the z+βy direction) as an o-ray. After passing through non-reciprocal combination-device 10, o-ray $310(o)$ becomes e-ray $311(e)$ in the principal direction (i.e., the positive z-direction) with the x−y polarization. E-ray $311(e)$ enters surface 585 of birefringent block 580 as light 381'.

Light 381' can be decomposed as light $381'(x)$ with the x-polarization and $381'(y)$ with the y-polarization. Light $381'(x)$ and $381'(y)$ travels in the positive z-direction with the phase velocity of the o-ray and the e-ray respectively. Light $381'(x)$ and $381'(y)$ are reflected by reflector 590, and become, respectively, Light $382'(x)$ and $382'(y)$. Light 382' ($x$) and $382'(y)$ travel in the negative z-direction with the phase velocity of the o-ray and the e-ray respectively. Light $382'(x)$ and $382'(y)$ are recombined at surface 585 as light 382'.

As shown FIG. 6c and FIG. 6d, light 382' entering non-reciprocal combination-device 10 can be decomposed as light $410'(o)$ with x+y polarization and as light ray $420'(e)$ with x−y polarization. Light $410'(o)$ and $420'(e)$ exit from non-reciprocal combination-device 10, respectively, as light $411'(o)$ with the y-polarization and as light $421'(e)$ with the x-polarization. Light $411'(o)$ and $421'(e)$ are combined and enter polarization single mode fiber 510 as light 511'. Light 511' in general has both the x-polarization component and the y-polarization component.

When light $310(o)$ has a certain bandwidth, with wavelengths ranging from $\lambda_2$ to $\lambda_1$, light 511' entering single mode fiber 510 can become depolarized.

FIG. 6a illustrates that optical depolarizing combiner 600 functions as both a depolarizer and a combiner. Light exiting from PM fiber 520 with the x-polarization and light exiting from PM fiber 520' with the Y-polarization are directed into single mode fiber 510, and combined as depolarized light.

Figure 7A:
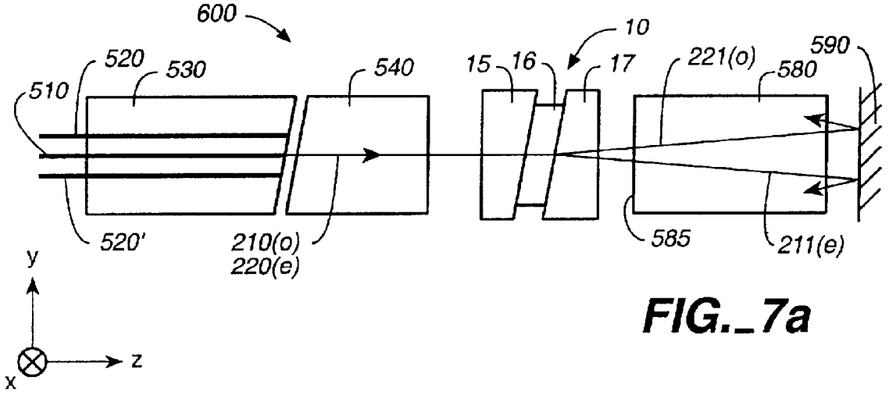
FIGS. 7a–7c shows that an optical depolarizing combiner 600 can also function as an optical isolator.

FIG. 7a illustrates that optical depolarizing combiner 600 can also function as an optical isolator. Light exiting from single mode fiber 510 can be decomposed as light $220(e)$ with the x-polarization and light $210(o)$ with the y-polarization.

Figure 7B:
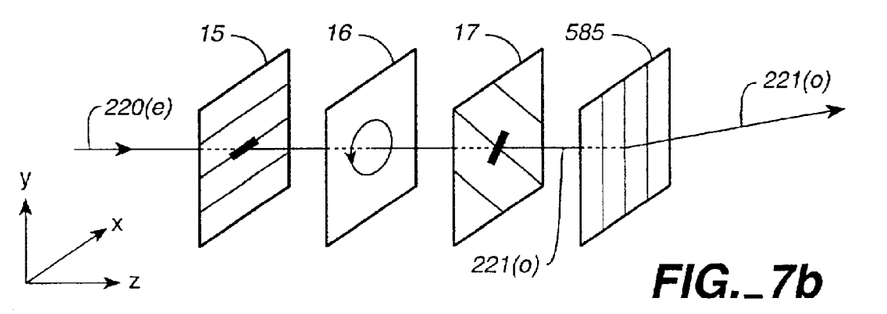

As shown in FIG. 7b, light $220(e)$ passes through non-reciprocal combination-device 10 as light $221(o)$ traveling in the first output direction (i.e., the z+γy direction) with the x+y polarization. Light $221(o)$ travels though birefringent block 580 and is deflected by reflector 590. After deflected by reflector 590, light $221(o)$ does not travel back to single mode fiber 510, first PM fiber 520, or second PM fiber 520'.

Figure 7C:
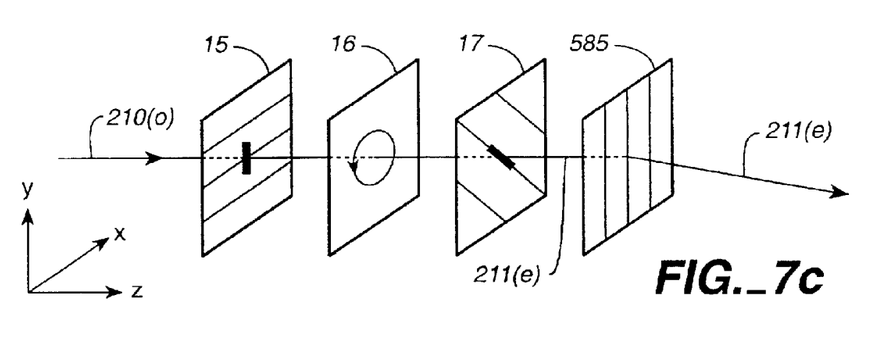

As shown in FIG. 7c, light $210(o)$ passes through non-reciprocal combination-device 10 as light $211(e)$ traveling in the second output direction (i.e., the z−γy direction) with the x−y polarization. Light $211(e)$ travels though birefringent block 580 and is deflected by reflector 590. After being deflected by reflector 590, light $211(e)$ does not travel back to single mode fiber 510, first PM fiber 520, or second PM fiber 520'.

Figure 8A:
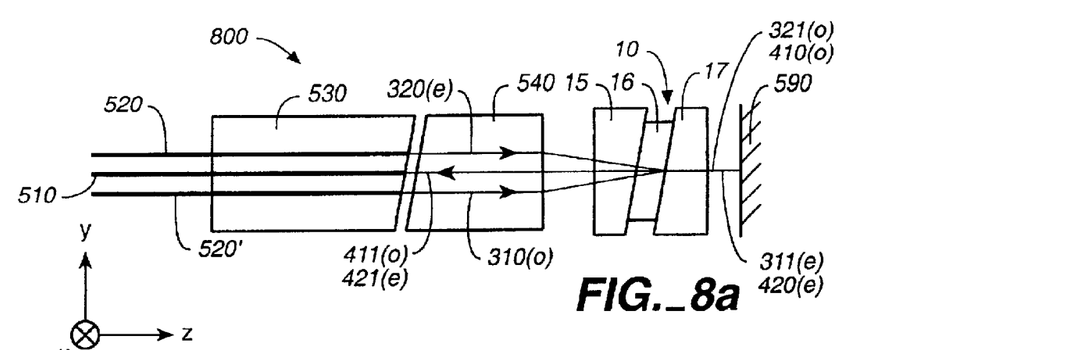
FIGS. 8a and 8b illustrate an implementation of an optical combiner 800.
Figure 8B:
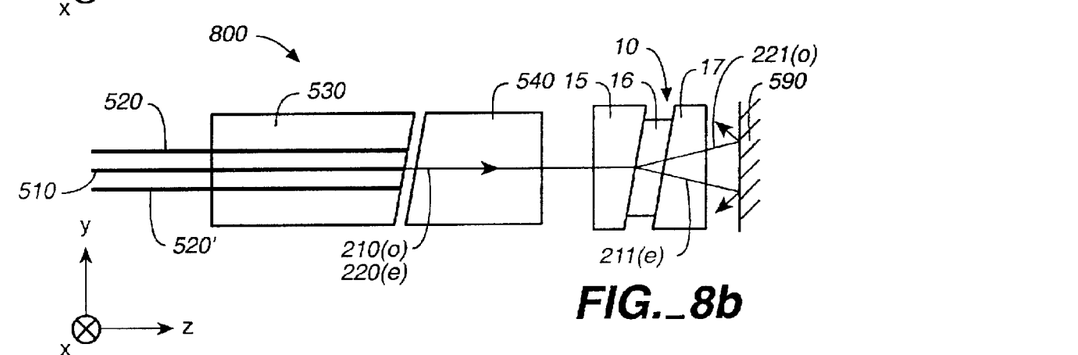

FIGS. 8a and 8b illustrate an implementation of an optical combiner 800 that includes non-reciprocal combination-device 10. Optical combiner 800 also includes a lens 540, and a reflector 590. A single mode fiber 510, a first PM fiber 520, and a second PM fiber 520' are coupled to lens 540. The positions of single mode fiber 510, first PM fiber 520, and second PM fiber 520' can be fixed with a capillary 530.

FIG. 8a illustrates that light 320(*e*) with the x-polarization exiting from first PM fiber 520 and light 310(*o*) with the y-polarization exiting from second PM fiber 520' are coupled to non-reciprocal combination-device 10. Light 320(*e*) and light 310(*o*) pass through non-reciprocal combination-device 10 as light 321(*o*) and light 311(*e*) respectively. Light 321(*o*) and light 311(*e*) are reflected by reflector 590, and enter non-reciprocal combination-device 10 as light 410(*o*) and light 420(*e*) respectively. Light 410(*o*) and light 420(*e*) pass back through non-reciprocal combination-device 10 as light 411(*o*) and light 421(*e*) respectively. Light 411(*o*) and light 421(*e*) are directed into single mode fiber 510, and are combined.

FIG. 8b illustrates that light exiting from single mode fiber 510 can be decomposed as light 220(*e*) and 210(*o*). Light 220(*e*) passes through non-reciprocal combination-device 10 as light 221(*o*) traveling in the first output direction (i.e., z+γy). Light 210(*o*) passes through non-reciprocal combination-device 10 as light 211(*e*) traveling in the second output direction (i.e., z−δy). Light 221(*o*) and light 211(*e*) are deflected by reflector 590. After being deflected by reflector 590, light 211(*e*) and light 221(*o*) do not travel back to single mode fiber 510, first PM fiber 520, or second PM fiber 520'.

Figure 9A:
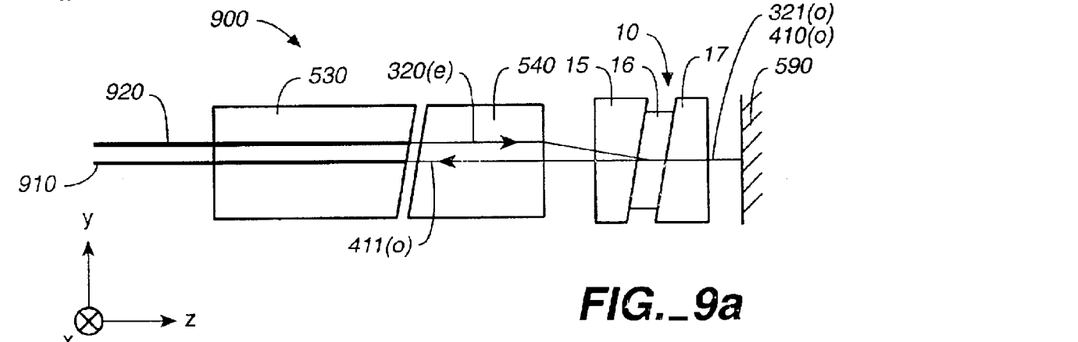
FIGS. 9a and 9b illustrate an implementation of a PM isolator 900.
Figure 9B:
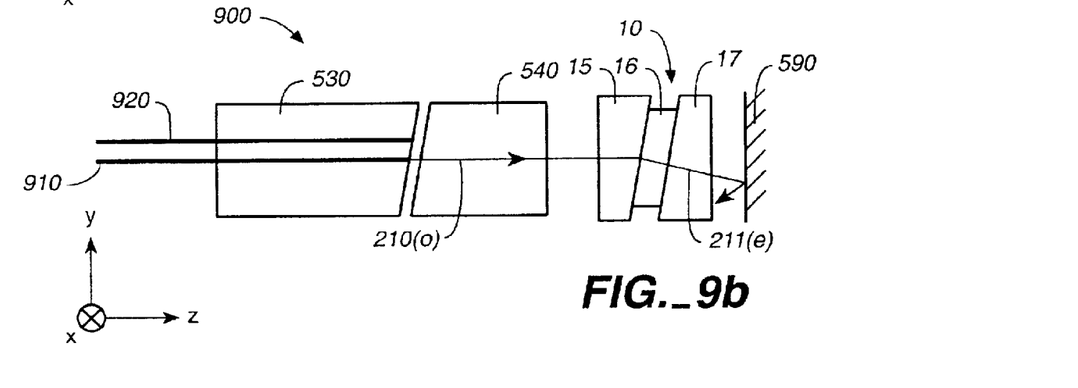

FIGS. 9a and 9b illustrate an implementation of a PM isolator 900 that includes non-reciprocal combination-device 10. PM isolator 900 also includes a lens 540, and a reflector 590. An output PM fiber 910, and an input PM fiber 920 are coupled to lens 540. The positions of output PM fiber 910, and input PM fiber 920 can be fixed with a capillary 530.

FIG. 9a illustrates that light 320(*e*) with the x-polarization exiting from input PM fiber 920 is coupled to non-reciprocal combination-device 10 as e-ray. Light 320(*e*) passes through non-reciprocal combination-device 10 as light 321(*o*). Light 321(*o*) is reflected by reflector 590, and enters non-reciprocal combination-device 10 as light 410(*o*). Light 410(*o*) pass back through non-reciprocal combination-device 10 as light 411(*o*) and is directed into output PM fiber 910.

FIG. 9b illustrates that light 210(*o*) exiting from input PM fiber 920 enters non-reciprocal combination-device 10 as o-ray. Light 210(*o*) passes through non-reciprocal combination-device 10 as light 211(*e*) traveling in the second output direction (i.e., z−δy). Light 211(*e*) is deflected by reflector 590. After being deflected by reflector 590, light 211(*e*) does not travel back to output PM fiber 910 or input PM fiber 920.

In the implementation of FIGS. 9a and 9b, output PM fiber 910 and input PM fiber 920 are aligned in such a way that light exits from input PM fiber 920 as an e-ray and enters output PM fiber 910 from non-reciprocal combination-device 10 as an o-ray. In an alternative implementation, output PM fiber 910 and input PM fiber 920 can be aligned in such a way that light exits from input PM fiber 920 as an o-ray and enters output PM fiber 910 from non-reciprocal combination-device 10 as an e-ray.

The optical depolarizer of FIG. 5a–5d and the optical depolarizing combiner of FIGS. 6a–6e include birefringent block 580 with an optical axis in the y-direction that forms a 45 degree angle with the optical axis of birefringent wedge 17. In alternative implementations, other angles between the optical axis of birefringent block 580 and the optical axis of birefringent wedge 17 can be selected.

In the implementations of FIGS. 5a, 6a and 7a, reflector 590 can be a mirror. In alternative implementations, reflective materials can be coated at the end of birefringent block 580 to function as reflector 590.

In the implementations of FIGS. 8a and 9a, reflector 590 can be a mirror. In alternative implementations, reflective materials can be coated on surface 19 of birefringent wedge 17 to function as reflector 590.

Birefringent block 580, birefringent wedge 15, and birefringent wedge 17 can be constructed from birefringent crystal materials, such as, calcite, rutile, lithium niobate or yttrium orthvanadate.

A birefringent crystal material in general has refractive indexes $n_e$ for e-ray and $n_o$ for o-ray. Non-reciprocal combination-device 10 can be constructed using birefringent crystal materials with indexes $n_e$ larger than $n_o$ or birefringent crystal materials with indexes $n_e$ smaller than $n_o$.

Figure 10A:
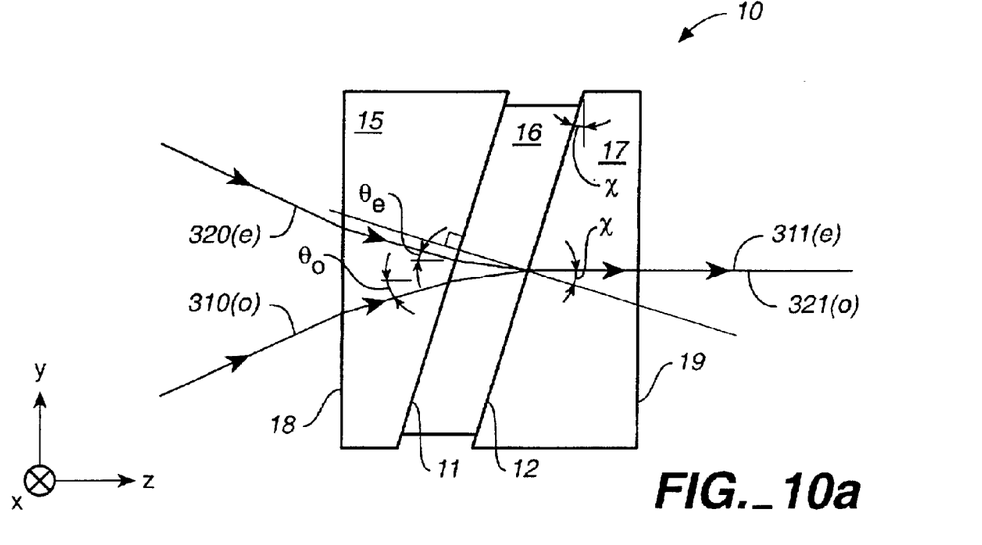
FIG. 10a illustrates an implementation of non-reciprocal combination-device 10 constructed using birefringent crystal materials with indexes $n_e$ larger than $n_o$.
Figure 10B:
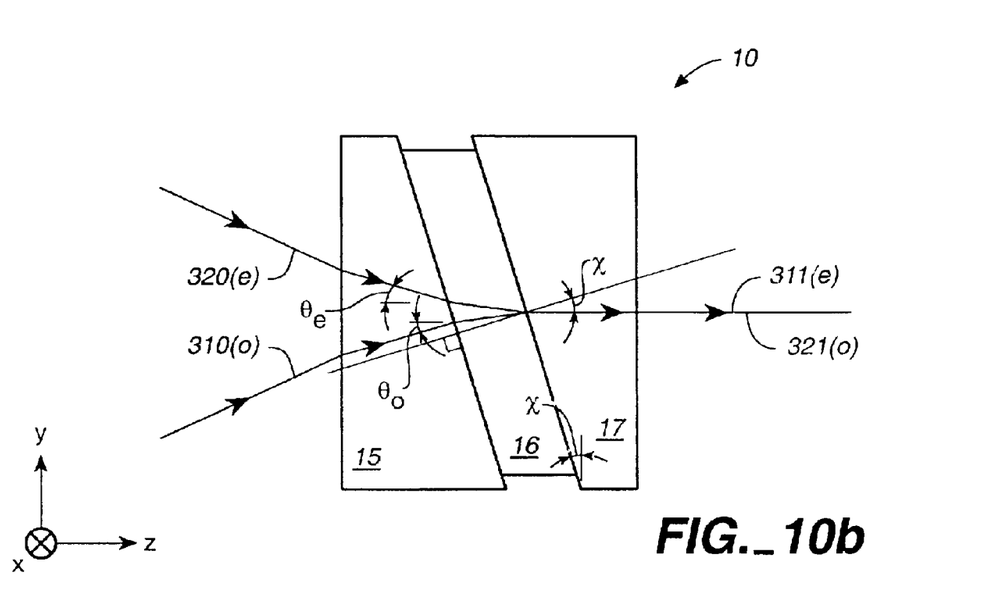
FIG. 10b illustrates an implementation of non-reciprocal combination-device 10 constructed using birefringent crystal materials with indexes $n_e$ smaller than $n_o$.

FIGS. 10a and 10b illustrate implementations of non-reciprocal combination-device 10 including birefringent wedges 15 and 17 in the form of tapered plate. Surface 11 of birefringent wedge 15 substantially parallels surface 12 of birefringent wedge 17. The tapering angle of birefringent wedges 15 and 17 is χ.

FIG. 10a illustrates an implementation of non-reciprocal combination-device 10 constructed using birefringent crystal materials with indexes $n_e$ larger than $n_o$. FIG. 10a also illustrates the paths traveled by e-ray 320(*e*) and o-ray 310(*o*). E-ray 320(*e*) is incident upon surface 11 of birefringent wedge 15 in the $\cos(\theta_e)$ z−$\sin(\theta_e)$ y direction and exits from birefringent wedge 17 in the positive z-direction. Here $\theta_e$, satisfies equation $n_e \sin(\chi - \theta_e) = n_o \sin(\chi)$. O-ray 310(*o*) is incident upon surface 11 of birefringent wedge 15 in the $\cos(\theta_o)$ z+$\sin(\theta_0)$ y direction and exits from birefringent wedge 17 in the positive z-direction. Here $\theta_o$ satisfies equation $n_o \sin(\chi + \theta_o) = n_e \sin(\chi)$.

FIG. 10b illustrates an implementation of non-reciprocal combination-device 10 constructed using birefringent crystal materials with indexes $n_e$ smaller than $n_o$. FIG. 10b also illustrates the paths traveled by e-ray 320(*e*) and o-ray 310(*o*). E-ray 320(*e*) is incident upon surface 11 of birefringent wedge 15 in the $\cos(\theta_e)$ z−$\sin(\theta_e)$ y direction and exits from birefringent wedge 17 in the positive z-direction. Here $\theta_e$ satisfies equation $n_e \sin(\chi + \theta_e) = n_o \sin(\chi)$. o-ray 310(*o*) is incident upon surface 11 of birefringent wedge 15 in the $\cos(\theta_o)$ z+$\sin(\theta_o)$ y direction and exits from birefringent wedge 17 in the positive z-direction. Here $\theta_o$ satisfies equation $n_o \sin(\chi - \theta_0) = n_e \sin(\chi)$.

A method and system has been disclosed for providing optical depolarizers, optical depolarizing combiners, optical combiners, and PM isolators. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An optical isolator comprising:
   a non-reciprocal combination-device having a principal direction including
   (a) a first birefringent wedge having a first optical axis perpendicular to the principal direction,
   (b) a second birefringent wedge having a second optical axis perpendicular to the principal direction, the second optical axis forming a first angle with respect to the first optical axis, and (c) a non-reciprocal rotating element optically coupled between the first and the second birefringent wedge and adapted to rotate a polarization of light passing therethrough by a second angle; and a reflector positioned proximate to the second birefringent wedge, for reflecting light exiting from the non-reciprocal combination-device in the principal direction to reenter the non-reciprocal combination-device, in a reverse principal direction.

2. The optical isolator of claim 1 further comprising a lens optically coupled to the first wedge.

3. The optical isolator of claim 2 further comprising a capillary for holding at least an input PM optical fiber and an output PM optical fiber proximate to the lens such that, light exiting from the input PM optical fiber passes through the lens and enters the non-reciprocal combination-device in an input direction with a first polarization, and light exiting from the non-reciprocal combination-device in the reverse principal direction passes through the lens and enters the output PM optical fiber.

4. The optical isolator of claim 2 further comprising a capillary for holding at least a first and a second input PM optical fiber, and an output optical fiber proximate to the lens such that, light exiting from the first input PM optical fiber passes through the lens and enters the non-reciprocal combination-device in a first input direction with a first polarization, and light exiting from the second input PM optical fiber passes through the lens and enters the non-reciprocal combination-device in a second input direction with a second polarization, and light exiting from the non-reciprocal combination-device in the reverse principal direction passes through the lens and enters the output optical fiber.

5. The optical isolator of claim 1 wherein the first angle is substantially 45 degrees and the second angle is substantially 45 degrees.

6. The optical isolator of claim 1 wherein the non-reciprocal rotating element is a Faraday rotator.

7. An optical isolator comprising:

a non-reciprocal combination-device having a principal direction including a first birefringent wedge, a second birefringent wedge, and a non-reciprocal rotating element, the non-reciprocal combination-device configured at least for enabling (1) light entering the first-birefringent wedge as an e-ray in a first input direction to exit from the second birefringent wedge as an o-ray in the principal direction, (2) light entering the first birefringent wedge as an o-ray in the principal direction to exit from the second birefringent wedge as an e-ray in a first output direction, (3) light entering the second birefringent wedge as an o-ray in the reverse principal direction to exit from the first birefringent wedge as an o-ray in the reverse principal direction; and a reflector positioned proximate to the second birefringent wedge for reflecting light exiting from the non-reciprocal combination-device in the principal direction to reenter the non-reciprocal combination-device in a reverse principal direction.

8. The optical isolator of claim 7 further comprising a lens optically coupled to the first wedge.

9. The optical isolator of claim 8 further comprising a capillary for holding at least an input PM optical fiber and an output PM optical fiber proximate to the lens such that, light exiting from the input PM optical fiber passes through the lens and enters the non-reciprocal combination-device in the first input direction as an e-ray, and light exiting from the non-reciprocal combination-device in the reverse principal direction passes through the lens and enters the output PM optical fiber.

10. The optical isolator of claim 8 further comprising a capillary for holding at least a first input PM optical fiber, and an output optical fiber proximate to the lens such that, light exiting from the first input PM optical fiber passes through the lens and enters the non-reciprocal combination-device in the first input direction as an e-ray, light exiting from the output optical fiber passes through the lens and enters the non-reciprocal combination-device in the principal direction as an o-ray, and light exiting from the non-reciprocal combination-device in the reverse principal direction passes through the lens and enters the output optical fiber.

11. The optical isolator of claim 7 wherein the non-reciprocal rotating element is a Faraday rotator.

12. A method of combing first and second polarized light to form combined light in an output port comprising the steps of:

providing a non-reciprocal combination-device having a principal direction and a reverse principal direction;

directing the first polarized light to enter the non-reciprocal combination-device in a first input direction, the first input direction making a non-zero angle with the principal direction, and to exit from the non-reciprocal combination-device in the principal direction as first intermediate light;

directing the second polarized light to enter the non-reciprocal combination-device in a second input direction, the second input direction making a non-zero angle with the principal direction, and to exit from the non-reciprocal combination-device in the principal direction as second intermediate light; and reflecting the first and the second intermediate light to pass back through the non-reciprocal combination-device in the reverse principal direction and enter the output port as combined light.

13. The method of claim 12 wherein the non-reciprocal combination-device includes a first birefringent wedge, a second birefringent wedge, and a non-reciprocal rotating element.

14. The method of claim 13 wherein the non-reciprocal rotating element is a Faraday rotator.

15. The method of claim 12 wherein the non-reciprocal combination-device includes (a) a first birefringent wedge having a first optical axis perpendicular to the principal direction;

(b) a second birefringent wedge having a second optical axis perpendicular to the principal direction, the second optical axis forming a first angle with respect to the first optical axis; and (c) a non-reciprocal rotating element optically coupled between the first and the second birefringent wedge and adapted to rotate a polarization of light passing therethrough by a second angle.

16. The method of claim 15 wherein the first angle is substantially 45 degrees and the second angle is substantially 45 degrees.

17. A method of directing polarized light from an input port to enter an output port comprising the steps of:

provide a non-reciprocal combination-device having a principal direction and a reverse principal direction;

directing the polarized light to enter the non-reciprocal combination-device in an input direction and to exit from the non-reciprocal combination-device in the principal direction as intermediate light;

reflecting the intermediate light to pass back through the non-reciprocal combination-device in the reverse principal direction and enter the output port; and reflecting light provided from the output port such that a direction of propagation of the light makes a non-zero angle with the reverse principal direction and preventing the light from reaching the input port wherein the non-reciprocal combination-device includes a first birefringent wedge, a second birefringent wedge, and a non-reciprocal rotating element.

18. The method of claim 17 wherein the non-reciprocal rotating element is a Faraday rotator.

19. The method of claim 17 wherein the non-reciprocal combination-device includes (a) a first birefringent wedge having a first optical axis perpendicular to the principal direction;

(b) a second birefringent wedge having a second optical axis perpendicular to the principal direction, the second optical axis forming a first angle with respect to the first optical axis; and (c) a non-reciprocal rotating element optically coupled between the first and the second birefringent wedge and adapted to rotate a polarization of light passing there thrum by a second angle.

20. The method of claim 17 wherein the first angle is substantially 45 degrees and the second angle is substantially 45 degrees.

21. The method of claim 19 wherein the step of directing the polarized light includes directing the polarized light to enter the non-reciprocal combination-device in the input direction as an e-ray and to exit from the non-reciprocal combination-device in the principal direction as an o-ray.

22. The method of claim 17 wherein the step of directing the polarized light includes directing the polarized light to enter the non-reciprocal combination-device in the input direction as an o-ray and to exit from the non-reciprocal combination-device in the principal direction as an e-ray.

* * * * *